(No Model.)

W. H. MERCER.
COTTON SCRAPER.

No. 281,103. Patented July 10, 1883.

Witnesses.
Louis L. Gardner
J. W. Garner

Inventor.
Wm. H. Mercer
per L. A. Lehmann
Atty

N. PETERS, Photo-Lithographer, Washington, D. C.

UNITED STATES PATENT OFFICE.

WILLIAM H. MERCER, OF MERCER, SOUTH CAROLINA.

COTTON-SCRAPER.

SPECIFICATION forming part of Letters Patent No. 281,103, dated July 10, 1883.

Application filed April 4, 1883. (No model.)

*To all whom it may concern:*

Be it known that I, WM. H. MERCER, of Mercer, in the county of Union and State of South Carolina, have invented certain new and useful Improvements in Cotton-Scrapers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-scrapers, but which is adapted to be used in connection with other plants which are planted in rows; and it consists in the combination of a suitable frame, suitable concavo-convex wheels which protect the growing plants, and at the same time cut shoulders upon each side of the growing plants, the scrapers which are attached to the frame outside of the wheels, and adjustable cultivator-standards which will follow behind the scrapers, and which are made to dirt the plants, as will be more fully described hereinafter.

The object of my invention is to provide a cotton-scraper, a cultivator by means of which the growing plants have a shoulder cut upon each of their sides, the dirt scraped away in between the rows, and a suitable quantity of dirt then thrown back toward the roots of the plants.

Figure 1:
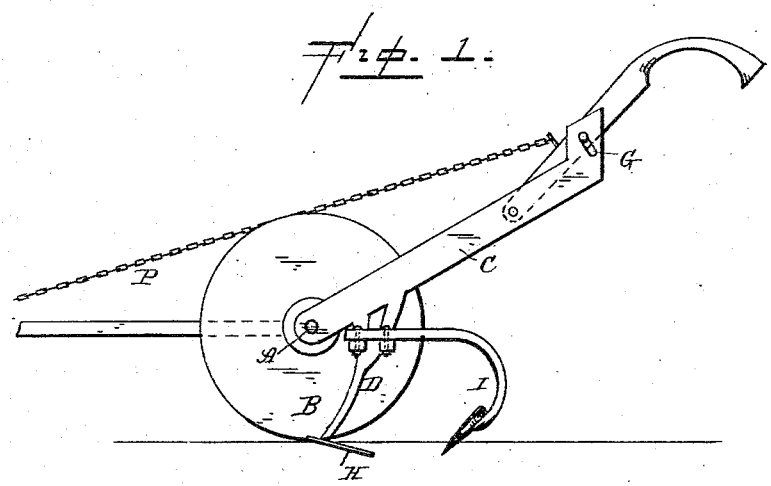
Figure 2:
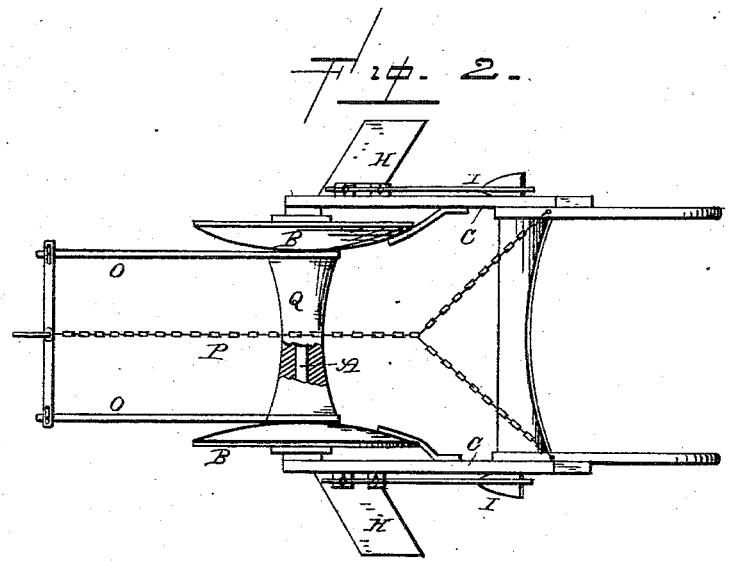

Figure 1 is a side elevation of my invention complete. Fig. 2 is a plan view of the same.

A represents the axle, upon opposite ends of which are placed the supporting-wheels B. These wheels, instead of being made as heretofore, are stamped up from any suitable metal, and are made concavo-convex. The convex shape upon the inner side of the wheel serves to pack the dirt around the roots of the plants; and this shape also serves to prevent the wheels from sinking too deeply into the ground while cutting the shoulder upon each side of the growing plants. This construction also enables the wheels to be stamped up instead of being cast, as has heretofore been done. Where an ordinary sharp-edged wheel is made, the trouble is that the wheels sink too deeply into the earth, and for this reason it becomes necessary to give them such a shape as will prevent this.

In order to regulate the distance between the wheels, a suitable collar, Q, is passed over the axle, and this collar is provided with a shoulder at each end for the draft-rod to catch over. This collar, being made removable, can readily be replaced by either a shorter or a longer one, according as it is desired that the wheels should be moved nearer together or farther apart.

The handle-bars C, which are formed in a single piece with the standards D, will preferably be made of cast-iron, and will be attached to the ends of the axle outside of the wheels. At the upper ends of these bars will be formed the slot G, by means of which the handles can be adjusted up and down to suit different heights of persons.

To the lower ends of the standards, which are formed as a part of the handle-bars, are attached the scrapers H, which may be of any desired length, and extend backward at any suitable angle.

In order to throw some of the dirt back toward the plants after the shoulder has been cut and the top of the earth scraped away by the scraper, there is formed on the side of the standard suitable lugs, down through which are passed clamping-bolts for the purpose of securing the cultivator I in position. These cultivators can be adjusted laterally by means of slots in the lugs, so as to move nearer to or farther from the growing plants, and thus throw a greater or less quantity of dirt back toward the roots of the plants. The wheels and the scrapers generally remove more earth from the side of the plants than is absolutely necessary, and so leave the roots more or less exposed. In order to cover these roots, the cultivator is used to move the dirt back, so as to cover the roots of the plants.

Attached to the axle is the draft rod or bar O, and in order to support this draft rod or bar in position an adjustable chain, wire, or cord, P, is used. The rear end of this cord, wire, or chain is attached to one of the handle rods or bars within easy reach of the driver. Where hard ground is encountered, by raising up the front end of the draft-rod and bearing down upon the handles, the wheels and the scrapers can be made to sink a greater distance into the earth than they otherwise would.

Having thus described my invention, I claim—

1. The combination of the axle, the wheels attached thereto, the handle-bars, and the standards for the scrapers, the standards being provided with lugs for the attachment of the cultivator, substantially as set forth.

2. The combination, in a cotton-scraper, of the axle, the wheels applied thereto, the handle-bars, and the scraper-standards stamped in a single piece, the standards being provided with slotted lugs, and the cultivator, whereby the cultivator can be adjusted back and forth in relation to the plants, substantially as specified.

3. The combination of the axle, the shouldered sleeve applied thereto, the wheels, the draft-rod, and an adjustable cord, wire, or chain, by means of which the draft-rod can be held in position, substantially as set forth.

In testimony whereof I affix my signature in presence of two witnesses.

W. H. MERCER.

Witnesses:
F. A. LEHMANN,
W. S. D. HAINES.